April 20, 1926.
C. E. BONNETT
ARTIFICIAL BAIT FOR FISHING
Filed August 2, 1922
1,581,833
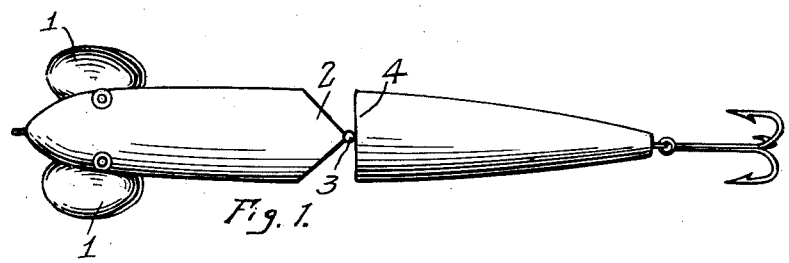
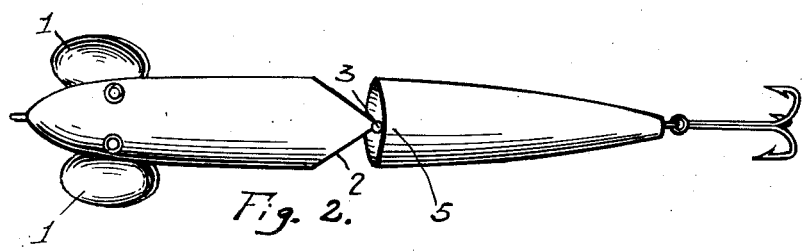
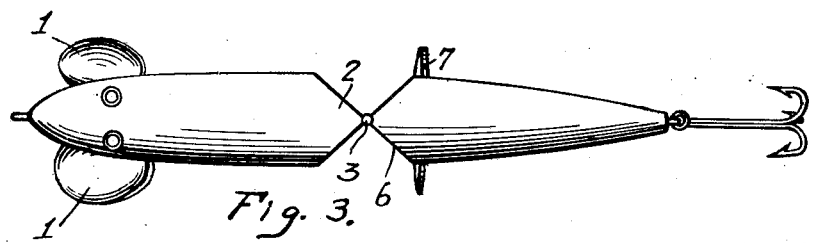
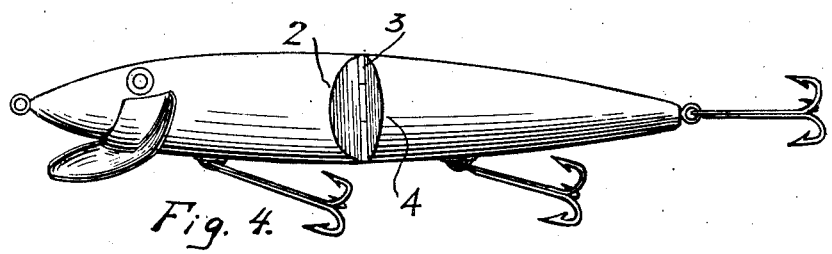
Clarence Elmore Bonnett
Inventor Patented Apr. 20, 1926.

1,581,833

UNITED STATES PATENT OFFICE.

CLARENCE ELMORE BONNETT, OF NEW ORLEANS, LOUISIANA.

ARTIFICIAL BAIT FOR FISHING.

Application filed August 2, 1922. Serial No. 579,304.

*To all whom it may concern:*

Be it known that I, CLARENCE ELMORE BONNETT, a citizen of the United States, residing at New Orleans, in the parish of Orleans and State of Louisiana, have invented new and useful Improvements in Artificial Baits for Fishing, of which the following is a full, clear, and exact description.

The invention relates to artificial baits for fishing and belongs to the class of articulated vibrating baits.

An object of the invention is to provide an artificial bait having the life-like movements of the natural bait.

A further object of the invention is to provide an articulated vibrating bait in which the vibration is caused by devices that resemble closely corresponding parts of the natural bait.

A further object of the invention is to provide a bait that is flexible enough to curve around the fish that strikes the bait, with the result that more than one set of hooks can engage in that fish.

The invention is described fully in the following specification and accompanying drawings, as it relates to a minnow, although the principles may be applied to any other artificial replica of the natural baits of game fish. In the drawings, Figure 1 is a top view of a minnow embodying the invention in one of its modifications. Figure 2 shows a top view of the minnow embodying the invention in its preferred form. Figure 3 is a top view showing a second modification of the invention. Figure 4 shows a side view of a minnow embodying the invention.

Reference to the drawings in detail shows under the numeral 1 the primary retarder. This consists, in its projecting parts of two lobes or fins that project out from the sides and partly underneath the bait. These lobes or fins are "cupped" on the forward side and project forward at an acute angle to the longitudinal axis of the bait. This novel construction functions by offering a high degree of resistance to the water and the force of the line to draw the bait forward and out of the water. This resistance retards the forward action of the bait and causes the hinged-together sections of the bait to vibrate from side to side—a motion that closely resembles the life-like movements of a minnow. These retarders are attached near the forward end of the first section of the bait, and are preferably made of sheet metal. Sheet celluloid also may be used.

In Figure 2, the preferred form of the secondary retarder is shown. The number 2 designates the wedge-shaped rearward end of the front section of the bait. This wedge-shaped end serves two functions: (1) it allows the rear section to vibrate from side to side, and (2) it permits the force of the water to strike directly against the cup-shaped surface 5 of the rear section. This makes a secondary retarder and vibrator of the surface 5 of the rear section. This vibration is further dependent upon the hinge part 3, which is preferably of the "butts" type, since that prevents a flow of water through the joint and thus retains the force to act against the retarding surface and so promotes the secondary vibration. The retarding surface 4 may be left a square edge, as shown in Figure 1, or a retarding surface 7 may be attached to a wedge-shaped forward end 6, as shown in Figure 3.

In this invention, the rate of vibration depends upon the speed with which the line is reeled in. When the line is reeled in slowly, the bait vibrates slowly like a slow-moving minnow, but when the line is reeled in rapidly, the bait has all the rapid vibration of a frightened fish, and does not have the haphazard darting of the rigid type of wabbling baits. It has the natural pulse-like vibration, such as can be produced only by the combination of primary and secondary retarders.

In the construction of this artificial bait, the body of the minnow may be made of wood or other buoyant material or means, and the hooks be attached by eyelets that allow the hooks to swing freely.

I claim as new and my invention:

1. An artificial bait consisting of a forward section, a retarder consisting of two lobed-shaped projecting parts cupped on the forward side and projecting forward at an acute angle to the longitudinal axis of the bait, extending out on each side and partly beneath the said forward section, said forward section having a wedge-shaped rear end, a rear section hinged to the wedge-shaped rear end of the forward section, retarding surfaces being formed on the forward end of the rear section and adapted to produce side to side vibrations when the bait is moved forward through the water, and hooks attached to both sections.

2. An artificial fish bait consisting of a forward section and a rear section, the rear portion of the forward section and the forward portion of the rear section being wedge-shaped and hinged together, the front portion of the forward section having a retarder consisting of two lobed-shaped projecting parts that are cupped on the forward side and which extend out on each side and partly beneath said forward section, projecting forward at an acute angle to the longitudinal axis of said forward section, a retarder consisting of two lobed-shaped parts extending at right angles from the axis of and attached to the rear section to the rear of the wedge-shaped portion, and hooks attached to both portions.

CLARENCE ELMORE BONNETT.